United States Patent [19]

Kronogard

[11] 4,361,059
[45] Nov. 30, 1982

[54] VEHICLE TRANSMISSION

[76] Inventor: Sven-Olof Kronogard, Karstorpsvägen 31, Lomma, Sweden, S 23400

[21] Appl. No.: 149,761

[22] Filed: May 14, 1980

Related U.S. Application Data

[60] Division of Ser. No. 148,217, May 9, 1980, which is a continuation of Ser. No. 844,079, Oct. 20, 1977.

[30] Foreign Application Priority Data

Oct. 20, 1976 [SE] Sweden .................. 7611617

[51] Int. Cl.³ .................. F16H 3/44; F16H 57/10
[52] U.S. Cl. .................. 74/759; 74/753; 74/661
[58] Field of Search .................. 74/753, 758, 759, 762, 74/763, 770, 765, 674

[56] References Cited

U.S. PATENT DOCUMENTS

| | | | |
|---|---|---|---|
| 2,582,487 | 1/1952 | Kelbel .................. | 74/759 |
| 2,785,589 | 3/1957 | Flinn .................. | 74/759 X |
| 2,806,388 | 9/1957 | Simpson .................. | 74/759 |
| 2,886,983 | 5/1959 | Miller .................. | 74/759 |
| 2,892,365 | 6/1959 | Winther .................. | 74/759 |
| 2,937,543 | 5/1960 | Förster .................. | 74/759 X |
| 2,990,727 | 7/1961 | Miller .................. | 74/759 |
| 3,090,256 | 5/1963 | Hause .................. | 74/759 X |
| 3,466,946 | 9/1969 | Noguchi et al. .................. | 74/759 |
| 3,482,469 | 12/1969 | Mori .................. | 74/759 X |
| 3,486,399 | 12/1969 | Förster .................. | 74/765 X |
| 3,979,974 | 9/1976 | Murakami .................. | 74/759 |

FOREIGN PATENT DOCUMENTS

| | | |
|---|---|---|
| 1816533 | 4/1970 | Fed. Rep. of Germany . |
| 1680281 | 4/1971 | Fed. Rep. of Germany . |
| 2406124 | 10/1974 | Fed. Rep. of Germany . |
| 168839 | 10/1959 | Sweden . |

Primary Examiner—Kenneth Downey
Assistant Examiner—Lawrence J. Gotts
Attorney, Agent, or Firm—Holman & Stern

[57] ABSTRACT

A vehicle transmission includes a planetary gearing having two sets of planets, one of which being of the stepped type with different diameters at opposite ends of the planets. Input is by way of the stepped planets and output is transferred by way of the other planets. A planet carrier for the stepped planets carries a sun wheel cooperating with the other planets, and is formed into a clutch housing having first and second compartments. The planet carrier for the other planets is provided with a clutch member, and a brake member, the former of which is adapted for cooperation with the second compartment of the clutch housing, while the other is adapted to engage the stationary casing enclosing the gearing. A ring gear cooperating with the stepped planets carries a clutch member adapted for engagement with the first compartment of the clutch housing. A sun wheel on a lay-shaft engages one of the stepped planets and supports a brake member adapted to engage a stationary portion of the gear casing. The clutch and brake members are selectively engageable for providing three gear steps while driving forward as well as in reverse.

3 Claims, 2 Drawing Figures

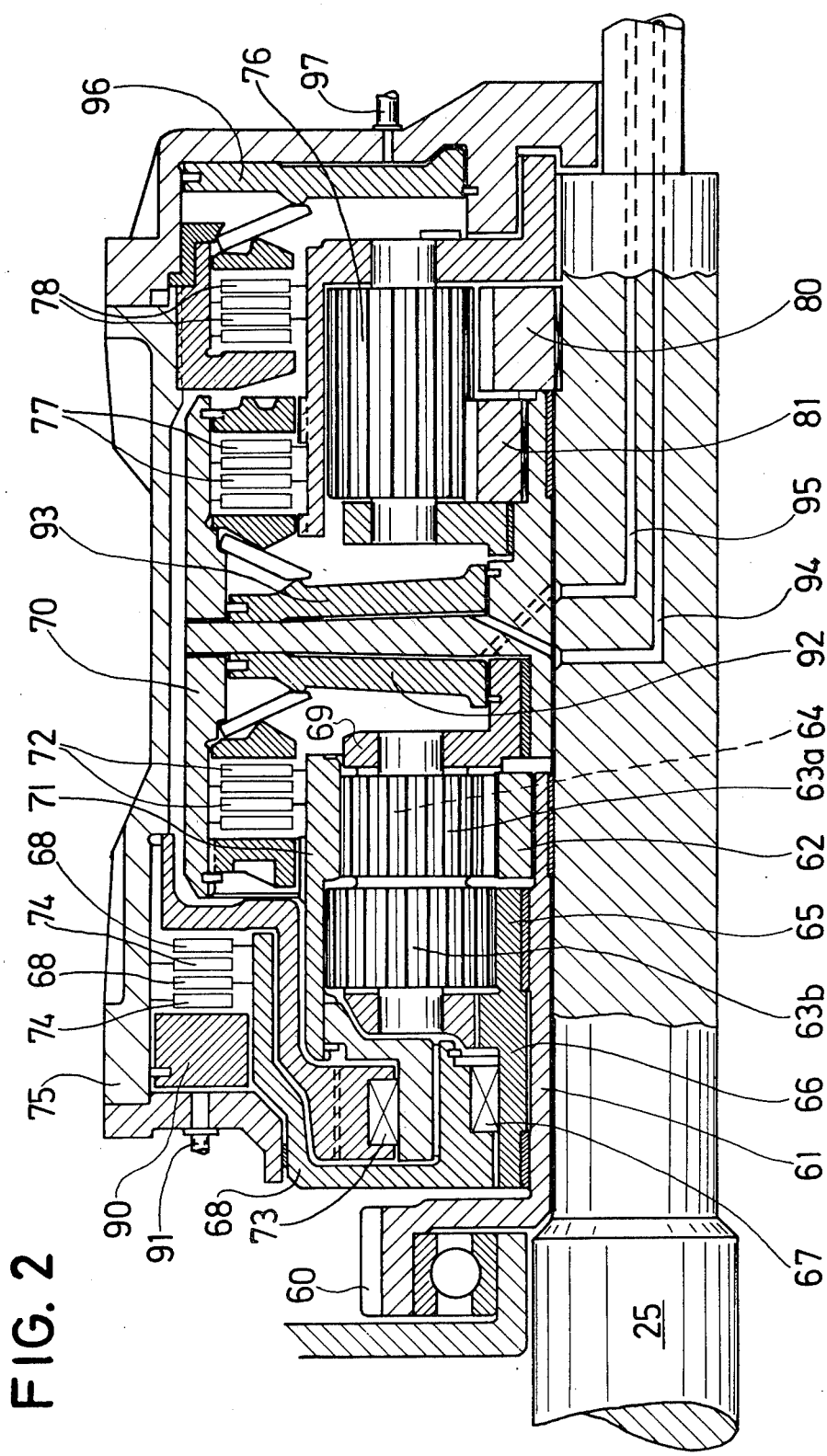

VEHICLE TRANSMISSION

This application is a division of Ser. No. 148,217 filed May 9, 1980 which is a continuation of application Ser. No. 844,079, filed on Oct. 20, 1977, and claiming priority from my Swedish application Ser. No. 76-11617-7, filed on Oct. 20, 1976.

BACKGROUND OF THE INVENTION

The present invention refers to a vehicle transmission, preferably fitted in conjunction with two or more prime movers operating upon a common output shaft and is related to the following copending applications filed simultaneously herewith: Ser. No. 149,760, entitled "A Vehicle Drive System"; and Ser. No. 149,759, entitled "A Vehicle Drive Plant". These copending applications are divisions of application Ser. No. 844,079, filed Oct. 20, 1977.

Considerable advantages with respect to production costs, spare part stock as well as service and maintenance in general are obtainable if one, or a few basic types of prime movers can be combined, instead of relying upon a selection from a series of power units with stepwise increasing outputs at the units. Depending upon the power required for a specific car, you install one of the basic engines, or possibly two, three or even four of them in combination. The term prime movers will here mean any type of internal combustion engine, as well as gas turbines. These may be one standard and one supercharged version of each basic engine, the two versions being identical in most respects.

When two or more prime movers are connected to a common output shaft, great care must be taken concerning the exchange ratio and reverse steps, so that a construction is obtained, which can handle high power outputs, but which may be fitted into the entity in a handy manner requiring only a limited space.

SUMMARY OF THE INVENTION

The aim of the present invention is to provide a compact and reliable transmission, which is attachable to one or more prime movers for handling the combined output therefrom.

The transmission includes a planetary gearing having a set of first, stepped planets and a set of second planets being enclosed in a stationary casing. An input shaft cooperates with the set of first planets, and the output shaft cooperates with the set of second planets, and individually actuable clutch and brake members are arranged to lock various rotatable components together, or to the stationary casing, in order to bring about the desired variation in exchange ratio and/or reverse driving.

BRIEF DESCRIPTION OF THE DRAWINGS

FIG. 2 shows an enlarged cross-sectional view of the transmission used in FIG. 1.

DETAILED DESCRIPTION

Figure 1:
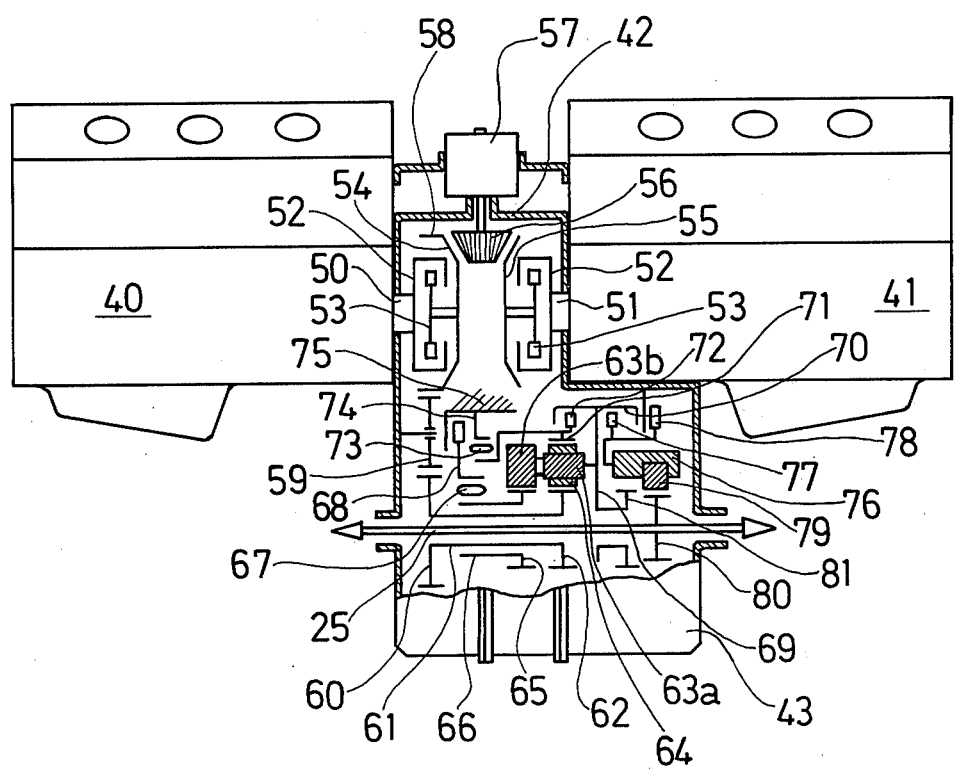
FIG. 1 shows a schematic view of a vehicle drive plant comprising two V-engines interconnected end-to-end by a transmission according to the invention.

As explained above it is of some advantage to be able to use two small, inexpensive engines in a vehicle having a high power output requirement, instead of one large expensive engine. The gain is not only to be found in using a cheap engine, but the production series of this engine will be further extended by this new market, which means that the price per horsepower may be further reduced as overheads can be spread over a larger number of items.

FIG. 1 shows two 6-cylinder V-engines 40, 41, which are interconnected end-to-end by means of a base block 42 enclosing clutches and transmission members associated with the output shafts of the engines, and which below the latter is extended by a stationary casing 43, which encloses a reduction gearing and a reversing mechanism.

The base block, 42, is provided with mounting members (not shown in the drawing) for carrying the entire engine plant in a vehicle. Either or both engines 40, 41 may be provided with a support member at its end remote from the base block.

The engines are fitted axially to the base block, and are rigidly secured thereto, and the output shaft 25 will be parallel with the engine crank shafts. A planetary gearing having three exchange ratio steps forward and three in reverse is fitted into casing 43, concentrically enclosing the output shaft 25.

The output shafts of the engines are denoted by 50 and 51, and clutch housings attached thereto are denoted by 52. Clutch members 53 for engagement with these housings are mounted at bevel gear wheels 54 and 55, respectively, which cooperate by way of at least one bevel pinion 56.

An auxiliary apparatus 57, e.g. an electric generator, is driven from the latter. The bevel gear 54 is provided with an external cylindrical gear ring 58, which by way of an intermediate gear wheel 59 drives a toothed wheel 60 on a hollow input shaft 61, concentric with the output shaft 25. The input shaft carries a sun wheel 62 at its inward end.

The gearing is of the planetary type, and comprises first stepped planets 63 and idler gears 64, interacting therewith and rotating in the opposite direction to the planets. The latter have a small-diameter end 63a and a large-diameter end 63b (one of the idlers is shown in FIG. 1, behind a stepped planet 63). The sun wheel 62 interacts with the small-diameter ends 63a of the stepped first planets through idlers 64. A shaft 66 carrying a further sun wheel 65, meshing with the large-diameter ends 63b, is via a one-way clutch 67 connected to a brake member 68.

The carrier for the stepped planets is denoted by 69 and includes a supporting disc carrying a clutch housing 70 having one compartment on each side of the supporting disc. A ring gear 71, interacting with the planets 63 through idlers 64 is provided with a clutch member 72 adapted to engage in one of the compartments in housing 70, and is coupled through a second one-way clutch 73 to a clutch member 74, which is stationary in relation to a portion of the surrounding base block, indicated at 75.

The transmission comprises a second set of planets 76, which are included in a reverse gearing. The planet carrier for these planets is provided with clutch member 77 and brake member 78. The first of these interacts with the other compartment in the movable clutch housing 70, and the other interacts with the casing of the base block.

These second sets of planets 76 interact via intermediate gears 79 with a gear wheel 80 on the output shaft 25. The planetary carrier 69 of the first set of planets is also connected to a sun gear 81 meshing with the second planets 76.

For forward driving, clutch member 77 is locked to the carrier 69 of the stepped planetary gears, and for reverse driving brake member 78 is locked to the casing of the base block.

The driving sun wheel 62 transmits in the first hand the engine torque to idlers 64, which in turn drive the stepped planets 63a and 63b, whose ends are rigidly joined to one another. One-way clutch 73 locks automatically when the forward clutch 77 is engaged, providing the low gear (first gear). If the brake member 68 engages member 74, the sun gear 65 is locked, providing an intermediate gear (second gear). If clutch member 72 is locked to the housing 70 direct drive is provided (third gear).

The arrangement can thus provide three gear steps forward, as well as reverse. Without major changes the reverse gear clutches can be located in front of the stepped gear clutches. Practically the same gear ratios are provided forward, as well as in reverse. By making gears 64 as stepped gears exactly the same gear ratio can be obtained, as well as many other possibilities.

FIG. 2 shows more in detail how a transmission of the type shown in FIG. 1 can appear. The same reference numerals are used, and it is pointed out, that the idlers 64 in FIG. 2 are located behind the stepped planets 63a, b.

A great advantage with this embodiment is that mutually identical clutch and brake members can be used at all four locations. The drawing shows, for the sake of clarity, only two stationary and two movable clutch discs, but the number can be increased, as necessary in working designs.

The brake 68/74 is activated by a plunger 90, when pressure fluid is supplied via a conduit 91. Clutches 72/70 and 77/70 are activated by means of plungers 92, 93. These operate in cylinders, which are supplied with pressure fluid through bores 94, 95 in shaft 25. Brake member 78 is made to engage the pressure casing by a plunger 96, operating in a cylinder supplied with pressure fluid via a conduit 97.

The supply of pressure fluid is governed in any arbitrary manner, well known to a man skilled in the art, and is not shown in detail here.

In the embodiment shown the second set of planets 76, and the reversing gear 79, cooperate with two sun wheels, but it is fully within the scope of the invention to replace one or both of the sun wheels with outer ring wheels.

What I claim is:

1. A vehicle transmission transferring torque from an input shaft to an output shaft by way of a planetary gearing including first, stepped planets having first and second end portions of different diameters intended for forward drive, and second planets for providing reverse drive, said gearing being enclosed in a stationary casing, and having a first planet carrier supporting said first planets and a second planet carrier supporting said second planets comprising, said input shaft concentrically encloses said output shaft, and said first planets are mounted on said first planet carrier to travel in a circular path concentrically around said input shaft, with said second planets axially spaced from said first planets and mounted on said second planet carrier to travel in a circular path coaxially with respect to said first planets, a first sun wheel on said input shaft for cooperation with the first end portions of said first planets, and a gear wheel on said first planet carrier for cooperation with said second planets, said first planet carrier comprising a planets supporting member having a substantially radially extending wall merging into an axially extending clutch housing to form first and second compartments located on opposite sides of said wall and concentrically surrounding the adjacent end portions of said first and second planets respectively, said second planet carrier comprising a planet supporting member, a second clutch member and a second brake member, said second clutch member being adapted for engagement with said second compartment of said clutch housing, and said second brake member being adapted for engagement with said casing enclosing the gearing, a ring gear cooperating with said first planets and carrying a first clutch member adapted for engagement with the first compartment of said clutch housing, and a gear wheel on said output shaft for cooperation with said second planets.

2. The vehicle transmission according to claim 1, wherein said ring gear is mounted in said casing by means of a first one-way clutch.

3. The vehicle transmission according to claim 1, further including a further sun wheel mounted upon a lay-shaft concentrically enclosing said input shaft for cooperation with the second end portions of said first planets, and a first brake member mounted by means of a second one-way clutch on said lay-shaft and adapted for engagement with said casing enclosing the gearing.

* * * * *